United States Patent [19]

Jones

[11] 3,851,987

[45] Dec. 3, 1974

[54] ECCENTRIC COUPLING MEANS

[75] Inventor: Thomas Alan Jones, Bolton, Conn.

[73] Assignee: Combustion Engineering, Inc., Windsor, Conn.

[22] Filed: Dec. 29, 1972

[21] Appl. No.: 319,954

[52] U.S. Cl................. 403/374, 403/377, 403/381, 294/86 A, 294/86.33
[51] Int. Cl.............................................. F16d 1/00
[58] Field of Search........... 403/343, 374, 377, 381, 403/301, 314, 341; 294/86 A, 86.26, 86.3, 86.33, 82 R

[56] References Cited
UNITED STATES PATENTS

| | | | |
|---|---|---|---|
| 2,075,241 | 3/1937 | Thompson | 294/86.33 X |
| 2,272,529 | 2/1942 | Larson | 294/86.33 |
| 3,184,196 | 5/1965 | Dent | 403/381 X |
| 3,280,439 | 10/1966 | McCarthy | 403/377 X |

FOREIGN PATENTS OR APPLICATIONS 681,648  11/1965  Belgium............................ 294/86 A Primary Examiner—Werner H. Schroeder
Attorney, Agent, or Firm—Stephen A. Schneeberger

[57] ABSTRACT

Coupling means including a male and female connector of novel construction are provided. The coupling means may find particular utility in the drive train for control elements in a nuclear reactor, though is not limited thereto. The female connector includes operating means for laterally engaging a part of the male connector inserted thereinto and moving it into restrained alignment with a retaining surface in the female connector. A recessed seat in the retaining surface locks the male connector in coupled relationship with the female connector. Additional locking means are disclosed.

13 Claims, 10 Drawing Figures

3,851,987

ECCENTRIC COUPLING MEANS

BACKGROUND OF THE INVENTION

The invention relates generally to coupling means and more particularly to coupling means employing male and female connectors. More particularly still, the invention relates to the particular structure of such male and female connectors.

A great many types of coupling means have been devised for coupling or joining one member with another. The particular design of a specific coupling is determined by such factors as load, required or limited degree of movement, size and nature of operating environment as well as others. In some instances several such factors require consideration. An example of this is found in the coupling or gripping means employed in a nuclear reactor for releasably engaging a driving mechanism with a member to be driven. More specifically such a coupling would be the gripper associated with a control element drive mechanism and the gripped portion of a control element or control element assembly, generally referred to in U.S. Pat. application Ser. 266,858 for "Guide Structure for Control Elements" filed June 28, 1972 by Frank Bevilacqua.

The aforementioned use, and the environment in which it occurs, dictates that the coupling means be capable of remote, relatively simple and extremely reliable engagement and disengagement. Further, the coupling means is required to retain the coupled elements against relative vertical and horizontal movement during operation.

One specific type of coupling means used for this particular application is described in U.S. Pat. application Ser. No. 311,186 for "Gripper Device" filed Dec. 1, 1972 by Thomas Alan Jones and Andrew James Anthony. The gripper of the Jones et al application relies on flexure of the gripping member to engage and release the member to be gripped.

SUMMARY OF THE INVENTION

According to the invention there is provided coupling means for joining two members with one another against relative motion therebetween. The coupling means is relatively simple and inexpensive to fabricate, is capable of remote operation of actuation and is engaged and disengaged with accuracy and reliability. Further, the coupling means is structured to prevent relative longitudinal and lateral motion between the coupled or joined members at their junction. Still further, the coupling means may include only substantially smooth surfaces where relative movement is required during engagement or disengagement to avoid fouling and the component parts are essentially rigid, requiring little or no flexure for the coupling or uncoupling operations.

The coupling means comprise a female connector, a male connector for relative insertion thereinto and operating means associated with said female connector and movable relative thereto for securing said male connector in mated relation with said female connector. The male connector includes a longitudinally extending member having a neck portion and a laterally enlarged head portion thereon. The female connector comprises a member having a longitudinally extending passage therein adapted for insertion therethrough of said head and an opening, or chamber, immediately inward of said passage and in partial registry therewith accommodating, or generally housing, the operating means. Further, the lateral offset of said chamber relative to said passage results in a generally laterally extending shoulder extending therebetween to form a retaining surface. The operating means is located in said chamber and is adapted to be rotated about an axis generally paralleling the passage and includes means for laterally engaging a part of the male connector inserted in the chamber. The means for laterally engaging the male connector preferably substantially surrounds said connector thereat and is eccentrically disposed relative to the axis of rotation of the operating means such that the male connector, or at least the head portion thereof, when engaged thereby is laterally displaced when the operating means is rotated from a first position to a second position. The eccentricity of the engaging means and the locations of the two rotational positions are selected such that in the first position the engaging means is substantially aligned with the passage to receive or discharge the male connector and in the second position the male connector is displaced laterally thereby to a position in which a laterally extending part of the head portion is longitudinally aligned with the retaining surface. In this said second position orientation, the male connector is effectively retained within the female connector. The head portion generally travels an orbital path about the axis of rotation of the operating means as it is moved between the first and second rotational positions.

The retaining surface preferably includes or defines a seat for the head portion having longitudinally extending side walls. The side walls of the seat will serve to prevent lateral orbital movement of the head portion about the axis of rotation of the operating means, when the head is in said seat and if greater than 180°; serves to center the head. The operating means is preferably adapted to be moved longitudinally of the female connector to allow necessary relative longitudinal movement between the female connector and the male connector to seat and unseat the head portion.

Biasing means may be provided for urging the operating means longitudinally toward the retaining surface such that it longitudinally contacts the male connector head portion and in turn urges it into the retaining surface seat. In this close longitudinal relationship the head is prevented from being longitudinally unseated and the walls of the seat laterally restrain it from that orbital motion about the axis of the operating means which is required to in turn allow the operating means to rotate, thereby locking the head in the seat and the operating means in its corresponding second rotational position.

Various opposing contacting surfaces may be beveled to facilitate longitudinal and lateral alignment of the male and female connectors and to insure a tight fit therebetween.

While the coupling means of the invention is particularly applicable for use in the drive train for a control element or control element assembly in a nuclear reactor, it will be appreciated that its utility extends well beyond such specific application and includes applications in which dependability, remote operability and relative simplicity of structure may be factors.

BRIEF DESCRIPTION OF THE DRAWINGS

FIG. 1 is a detailed longitudinal view, in section, of

FIG. 7 is a side view taken along line 7—7 of FIG. 1 of a tool used for the actuation of the female connector operating means.

DESCRIPTION OF THE PREFERRED EMBODIMENT

Figures 1, 7:
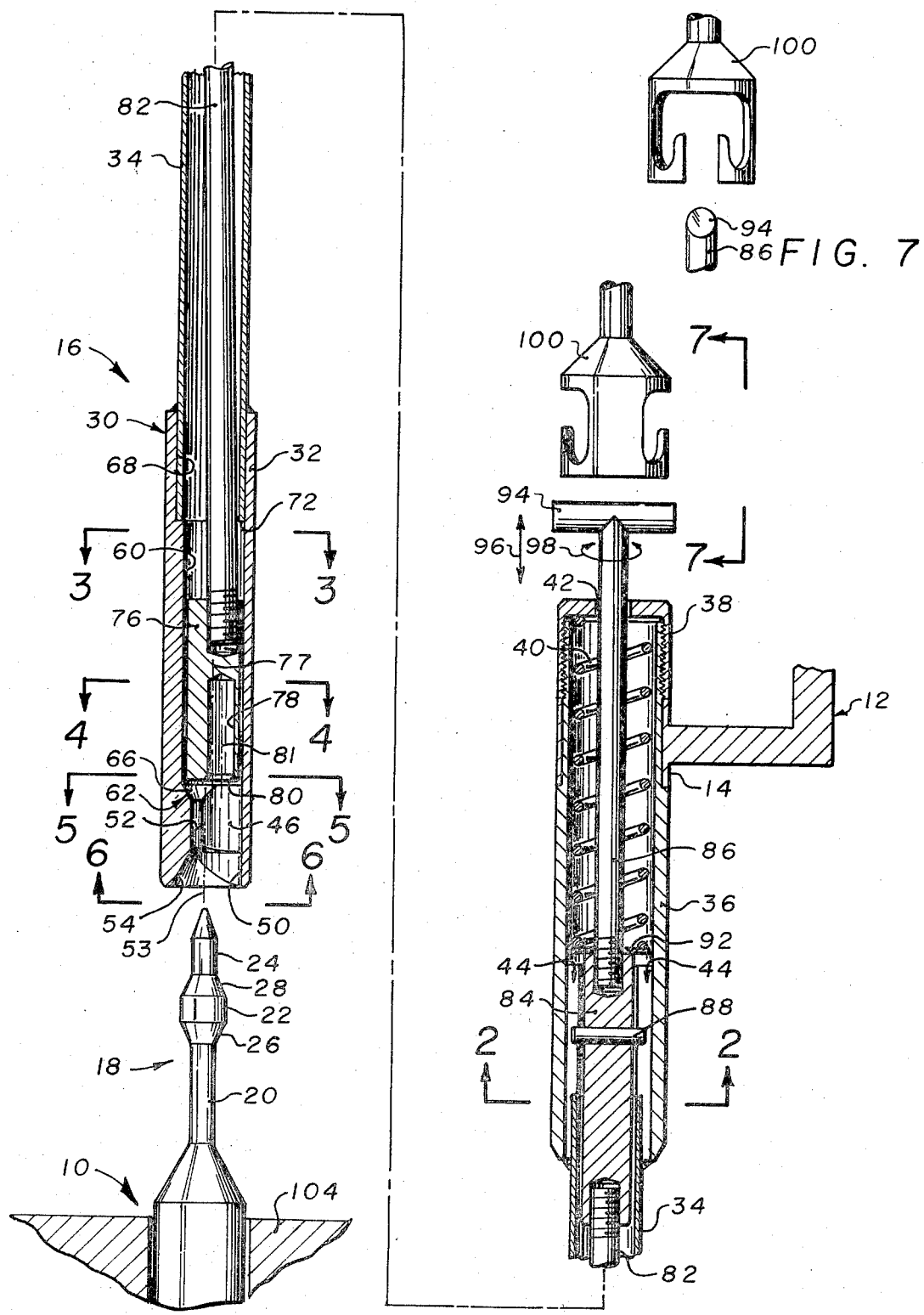

Referring now to the drawings, FIG. 1 depicts the coupling means of the invention including a male connector and a female connector having actuating means associated therewith. The coupling means as depicted herein are particularly suited for use as a gripper in a nuclear reactor in a manner as generally described in the aforementioned application Ser. No. 311,186 of Jones et al. It will be appreciated, however, that the coupling means are capable of utilization in various environments and applications other than a reactor, and for that reason the invention is described generally and essentially independent of a particular operating environment. Essentially all of the materials in the described embodiment are metal and suited for the particular environment of intended use.

A first member 10, which may be a rod, tube, cable or the like is to be releasably joined or connected with a second member 12, which also may be a rod, tube, cable or the like. In a reactor, member 10 might be a control element or the yoke of a control element assembly and member 12 might be a control element assembly yoke or similar longitudinally driven device. Member 12 might take the form of magnetic jack grippers for direct longitudinal driving engagement with the coupling means of the invention. As depicted in FIG. 1, member 12 includes a collar 14 for securely engaging a longitudinally extending female connector 16, said member and female connector being movable longitudinally in unison. A male connector 18 is affixed to the end of member 10 and may be formed integrally therewith. Male connector 18 comprises a longitudinally extending male member of generally circular cross section which includes a longitudinally extending neck portion 20 and a laterally or radially enlarged head portion 22 longitudinally outward therealong. Typically, the diameter of head 22 will be 1.5 to 2 times that of neck portion 20. However this may vary. Further, head 22 may include a crown portion 24 of generally circular cross section extending longitudinally outward therefrom opposite neck 20. The crown 24 is of smaller diameter than head 22. Head 22 is connected with neck 20 through a beveled surface 26 making an angle of 25° with the longitudinal axis and the crown 24 is also connected with the head 22 through a beveled surface 28 making a 25° angle with the longitudinal axis. It will be appreciated that the angle of bevel 26 might be other than 25°. Preferably the angle is within the range of 15°–45°. Further still, the crown 24 terminates longitudinally outwardly in a conical or beveled surface to aid in introduction and alignment, as will become evident below.

Female connector 16 includes a longitudinally extending housing 30. Housing 30 may be formed of a single cylindrical element or, as depicted herein, comprises longitudinally extending serially arranged cylindrical members 32, 34 and 36 and an end plate 38. Member 36 is tubular and has a first inner diameter along the longitudinally inner or rearward portion thereof and a second lesser inner diameter longitudinally outward or forward thereof.

Figure 2:
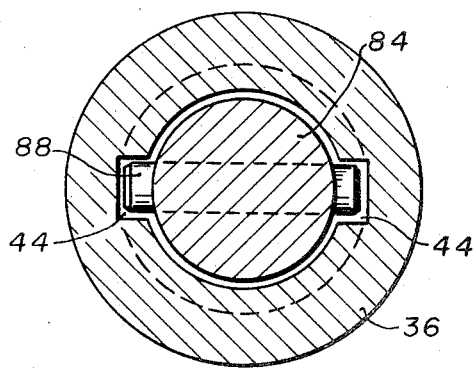
FIG. 2 is a cross-sectional view taken along line 2—2 of FIG. 1.

A pair of radially outwardly recessed slots 44 extend along the smaller inner diameter of member 36 in parallel 180° spaced relationship to form guide slots as seen in FIGS. 1 and 2. Slots 44 extend rearwardly to the larger inner diameter portion of element 36.

End plate or cover 38 substantially covers the rearward end of member 36 in threaded engagement therewith and serves as a rear seating surface for coiled compression spring 40. In the embodiment shown, cover 38 also secures member 12 to female housing 30. A radially centered opening 42 through end plate 38 allows passage therethrough of part of the actuating means to be described below.

Member 34 is tubular, is coaxial with member 36 and is rigidly affixed to the forward end thereof, as by welding. Member 34 may be of substantially any length, as dictated by the particular application. If the coupling means are to be used intermediate a control element assembly yoke and an individual control element, as described in the above-mentioned application to Jones et al, member 34 may be several feet in length. Alternatively, member 34 might be omitted altogether.

Member 32 provides a surface for retaining male connector 18 in coupled engagement and it houses operating means for moving the male connector into retained alignment with said surface. Member 32 is preferably a cylindrical member having the following described openings and passages therein.

Member 32 includes a passage 46 which extends longitudinally thereinto from the outer or forward end and an opening or chamber 48 extending longitudinally thereof from the inner end of passage 46 substantially to the inner or rear end of the member.

Figure 6:
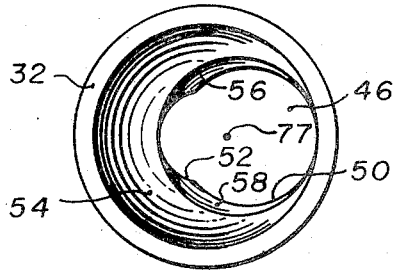
FIG. 6 is a cross-sectional view taken along line 6—6 of FIG. 1.

Passage 46 is formed by a first longitudinally extending bore 50, seen in FIGS. 1 and 6, sized radially to pass the diameter of head 22 therethrough with, for instances, 10 mils radial clearance and a second longitudinally extending bore 52 parallel and essentially coextensive with bore 50 in partial radial coincidence therewith. Member 32 is, for instance, 1.5 to 2.5 times the diameter of head 22; and bore 50 which is only slightly largr than the head is laterally or radially offset from the centerline of the member toward one side thereof.

Bore 52, which forms a longitudinally extending side-lobe to passage 46, is preferably concentric with the centerline 53 of member 32. Centerline 53 is the centerline or axis of female housing 30. The diameter of bore 52 is preferably only slightly greater than that of male member neck 20 and bores 50 and 52 radially overlap, or coincide, such that a longitudinally extending opening exists between their lines of intersection of sufficient width to allow neck 20 to be moved laterally from bore 50 into bore 52 in substantially coaxial relationship therewith, for a purpose to be later described.

A radially inwardly tapered conical bevel extends longitudinally into the outer, or forward end of member 32 to create a beveled surface 54 which facilitates introduction of crown 24 and head 22 into passage 46. The axis of beveled surface 54 is substantially concentric with that of member 32 and the bevel is cotangent with the radially outermost wall of bore 50 at the forward end of the member.

A longitudinally extending counter-bore 56 may be provided in the forward end of member 32 if additional channeling or aligning of the male and female connectors is required during introduction. This may be necessitated by some lateral misalignment between the connectors. Counter-bore 56 is of a diameter and positioned laterally in member 32 such that it circumscribes the combined bores 50 and 52 and is cotangent therewith at their opposite circumferential extremes. Counter-bore 56 extends longitudinally to, or slightly beyond, the inner end of beveled surface 54 and a beveled surface 58 connects the walls of counter-bore 56 with those of bores 50 and 52.

The opening or chamber 58 is provided by a large cylindrical bore 60 extending longitudinally from the inner or rear end of member 32 forwardly therein to the inner end of bore 50. The bore 60 is of greater diameter than, and is parallel to, bore 50. Bore 60 is cotangent with bore 50 at the latter's point of closest proximity with the outer surface of member 32 and its axis lies on a plane which includes the axes of bores 50 and 52. Bore 60 preferably extends radially outwardly beyond the radial extent of bore 52 also. In this embodiment, passage 46 is entirely in registry, or aligned, with part of chamber 48 or conversely, chamber 48 is only partially in registry, or aligned, with passage 46.

Because the inner ends of bores 50 and 52 and the outer end of bore 60 are longitudinally coterminal and because bore 60 extends laterally beyond most of the lateral perimeter of passage 46, a generally laterally extending shoulder 62 is formed between the wall of bore 60 and that of passage 46. The generally rearward or longitudinally inward facing surface 64 created by shoulder 62 serves as a retaining surface for the head 22, as will become evident.

Retaining surface 64 might be a surface which extends entirely transversely of the longitudinal axes at a 90° angle thereto; however a certain locking feature may be obtained by forming a longitudinally outwardly recessed seat 66 in surface 64. Seat 66 preferably includes generally longitudinally extending side walls which are intended to restrain head 22 against lateral motion in certain directions. Seat 66 in the preferred embodiment is provided by a conical bevel in surface 64 which is coaxial with bore 52 and which makes an angle of about 25° with the longitudinal axes to compliment the bevel 26 on male connector 18. The depth of seat 66 is sufficient to provide lateral restraint to the seated male connector and will generally be that at which the conical bevel extends radially to a point of cotagency with bore 60.

Member 32, containing passage 46, chamber 48 and retaining surface 64 is joined at or near its rearward end with the forward end of member 34. A counter-bore 68 in the rear part of bore 60 and somewhat offset from the axis thereof creates a crescent shaped seating land 70 for the forward end of member 34. Counter-bore 68 is coaxial with bore 52 and is of somewhat larger diameter than bore 60, such that it is cotangent with one side of bore 60 and extends beyond the other resulting in a crescent shaped seating land 70. The outer diameter of member 34 is slightly less than that of counter-bore 68 and the forward end of the member is supported against seating land 70. Members 32 and 34 are rigidly joined, as by welding. Because land 70 is not a complete circle, the end face of member 34 about part of its circumference extends radially into bore 60 to form a stop 72, the function of which is described hereinafter.

Female connector 16 and male connector 18 are movable longitudinally relative to one another by longitudinally displacing member 10 or 12 or both, such that head 22 of male connector 18 may be introduced to bore 50 of passage 46 and moved inwardly, relative thereto. The neck 20 is of sufficent length to permit head 22 to completely enter chamber 48. Connectors 16 and 18, or at least portions thereof, are laterally movable relative to one another to allow head 22 to be moved laterally of chamber 48 to a position in which at least part of it is longitudinally aligned with retaining surface 64, and more particularly, with seat 66 thereof.

Operating means, such as plunger 76, is provided for moving head 22 relatively laterally of female connector and its chamber 48. Plunger 76 is a cylindrical rod-like member of smaller diameter than bore 60 of chamber 48 to allow relative longitudinal and rotational movement therebetween. Plunger 76 is capable of rotating about a longitudinally extending axis 77 which laterally is substantially fixed relative to the bore 60 forming chamber 48. Preferably the diameter of plunger 76 is only slightly less than that of bore 60, for instance 0.020 inch, such that the bore or chamber provides the principal lateral support for it. Accordingly, the plunger 76 is substantially coaxial with chamber 48. It will be appreciated that the plunger 76 might be of even smaller diameter if sufficient lateral support may be provided by other means to maintain a substantially constant longitudinal alignment with chamber 48. Plunger 76 includes a longitudinally extending cylindrical bore 78 in the outer or forward end thereof for laterally engaging part of male connector 18 when it is inserted in female connector 16. In the preferred embodiment, bore 78 is of sufficient length and diameter to receive at least the full longitudinal extent of male crown 24 therewithin. The outer end of bore 78 includes a beveled surface 80 therearound for close mating contact with the head-crown bevel 28. The diameter of bore 78, and accordingly, of bevel 80, as well as the angle of bevel 80, are such that bevel 80 may facingly contact bevel 28 about is circumference to laterally and longitudinally position head 22 relative to plunger 76.

Figure 8:
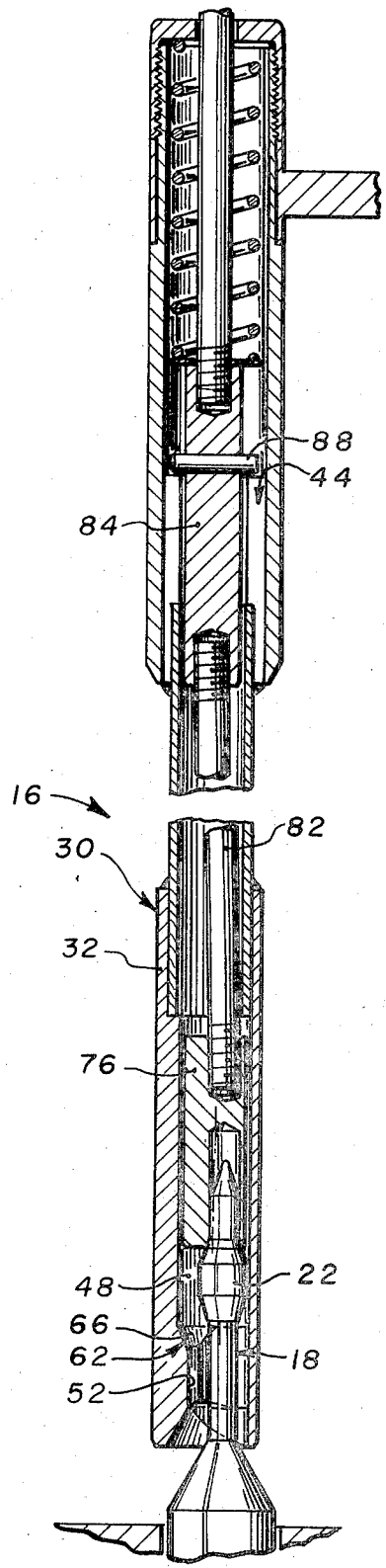
FIG. 8 is a view similar to that of FIG. 1 and showing the male connector engaged by the female connector operating means in its first rotational orientation during the coupling and/or uncoupling operation.

Most importantly, the centerline 81 of bore 78, and particularly of the beveled surface 80 therein, is laterally offset, or eccentric relative to the axis of rotation 77 of plunger 76. The degree or extent of eccentricity is that which is required to make bevel 80 and bore 78 is substantially coaxial or longitudinally aligned with bore 50 of passage 46 in a first rotational positioning of plunger 78 relative to female connector member 32, as seen in FIGS. 1 and 8. Plunger 76 is rotatable relative to member 32 to a second rotational positioning in which bore 78 and bevel 80 are displaced laterally from the first rotational positioning relative to member 32. The second rotational positioning is preferably at 180° to the first to obtain maximum lateral displacement of bore 78. Further, the second rotational positioning is intended to directionally correspond laterally with the positionings of side lobe bore 52 and seat 66 relative to bore 50. In rotating plunger 76 between the first and second rotational positions, the axis 81 is translated or defines an orbital path about the axis 77 of the plunger. Accordingly, the portion of the male connector 18 engaged thereby will also be carried in the same orbital path, thus moving head 22 in substantially the same orbital path.

Figure 9:
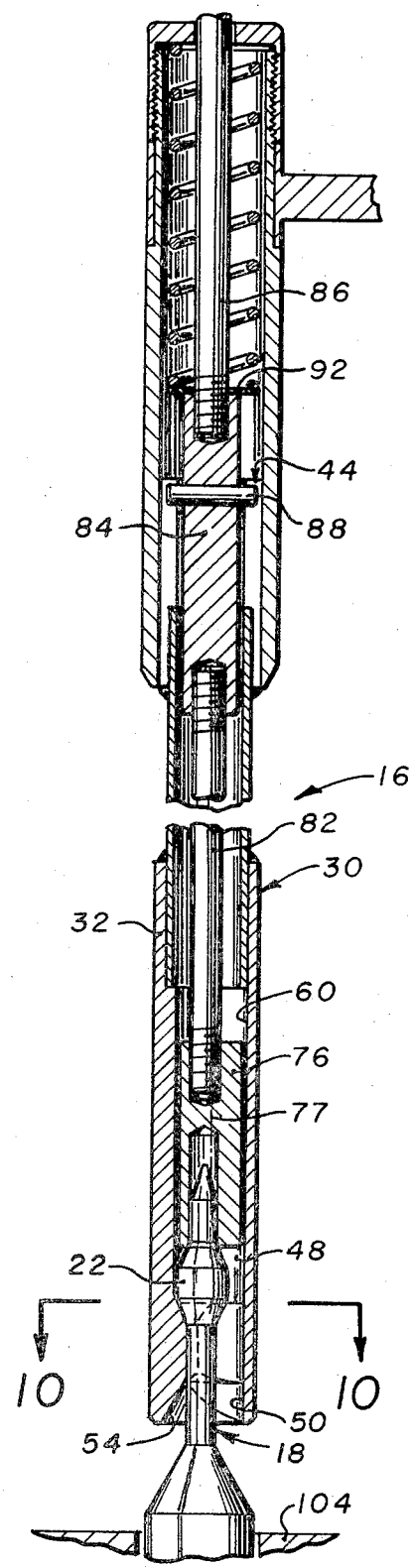
FIG. 9 is a view similar to those of FIGS. 1 and 8 and showing the operating means in its second rotational orientation and the male connector seated and locked in coupled relation with the female connector.

The diameter of head 22 is sufficiently near that of passage bore 50 and the eccentricity of bore 78 is such that, in the second rotational positioning of plunger 76, a laterally extending part of the head carried by the plunger will be longitudinally aligned or in registry with the retaining surface 64, and particularly the seat 66 thereof, as seen in FIG. 9. More specifically, the eccentricity of bore 78 is such that its axis 81 is substantially aligned with the centerline or axis of side lobe bore 52 in the second rotational positioning. This arrangement allows plunger 76 to move male connector 18 laterally, relative to female connector 32, to a position at which it, or more particularly its neck 20, is substantially coaxial with member 32.

The plunger 76 is capable of relative longitudinal movement within chamber 48. Stop 72 extends laterally into bore 60 a sufficient distance to longitudinally contact the rear end of plunger 76 to define a withdrawn limit position and the retaining surface 64 limits the forward or advanced longitudinal positioning of the plunger relative to member 32.

The length of plunger 76 is such that, in the withdrawn limit position, there is sufficient axial or longitudinal distance between the front end of the plunger and retaining surface 64 to allow head 22 and neck-head bevel 26 to enter chamber 48 when crown 24 enters bore 78, allowing head 22 to be moved laterally into registry with seat 66.

Means for actuating plunger 76, both rotationally and longitudinally of member 32, include actuating rods 82 and 86 and a coupler member 84. Actuating rod 82 is of considerably smaller diameter than the inside diameter of member 34 and is fixedly joined at one end, as by threaded and welded engagement, with the rear portion of plunger 76. While for certain applications the rod 82 might be coaxial with plunger 76, it is laterally offset in the preferred embodiment such that it is substantially coaxial with axis 81 of bore 78 for reasons to be later explained. The other end of rod 82 is fixedly joined, as by threaded and welded engagement, with the outer or forward end of coupler member 84. Coupler member 84 is rod-like and of somewhat smaller diameter than the smallest inner diameter of member 36 and includes a dowel pin 88 extending transversely therethrough and rigidly secured thereto. Dowel pin 88 extends through the axis of coupler 84 and projects radially beyond the opposite sides thereof a sufficient distance to extend into guide slots 44 in member 36 for longitudinal movement therewithin. Pin 88 is sized relative to slots 44 to prevent rotation of coupler 84 when the pin is in the slots. Rod 86 is coaxial with coupler member 84, extends rearwardly from member 84 and is fixedly joined thereto, as by threaded and welded engagement. Rod 86 is of smaller diameter than coupler member 84, creating an annular recess between it and member 36 for coil compression spring 40 and creating a rearwardly facing support land for washer 92. Rod 86 extends rearwardly from coupler 84 through opening 42 in end plate 38 and terminates with a rod-like handle 94 extending radially outward from opposite sides of the rod. Opening 42 is sized to closely encircle rod 86, allowing relative longitudinal and rotational motion therebetween.

Rod 86 is longitudinally movable relative to end plate 38 such that the actuating means may move plunger 76 longitudinally of member 32. The lengths of rods 82 and 86 and coupler 84 and the longitudinal placement of dowel pin 88 therealong is such that the pin is within guide slots 44 when plunger 76 is advanced sufficiently to be either at its advanced limit position against retaining surface 64 or longitudinally in contact with bevel 28 of male connector 16 when head 22 is seated in seat 66, and the pin escapes rearwardly of the guide slots when the plunger is moved rearwardly to or near the withdrawn limit position. The azimuthal angle of dowel pin 88 about the axis of coupler 84 is selected such that it is aligned with guide slots 44 only when plunger 76 is in its first or its second rotational positionings, thereby to lock the plunger in its first or second rotational positions when it is advanced sufficiently from the withdrawn position.

Spring 40 acts between end plate 38 and washer 92 to urge the actuating means and plunger 76 forward or outward relative to housing 30. Washer 92 is supported sufficiently rearwardly along the actuating means so as not to contact the key seat bearing portion of member 36, even when plunger 76 is advanced to its limit, as seen in FIG. 1.

Actuating rod 86 is adapted to be reversably moved longitudinally of housing 30, as indicated by arrows 96, and rotationally thereof, as indicated by arrows 98. The force needed to produce this movement may be applied directly or indirectly to the actuating means and might be manual or mechanical or electromechanical in origin. As an example, a tool 100, seen in FIGS. 1 and 7, includes a hollow cylinder sized radially to receive the shaft or rod 86 and having two generally T-shaped slots in opposite sides thereof for admitting the handle 94 of the rod and permitting limited rotation of the tool relative to the handle when the handle is in the cross-arms of the of the "T." A slight lip may be provided in the outer ends of the "T" cross-arms to "lock" the handle therein. Tool 100, which might be manually operated, may thus be used to axially and rotationally move the actuating means. It will be appreciated that these forces applied to the actuating means act relative to housing 30.

Referring now to the operation of the coupling means of the invention, FIG. 1 shows the male and female connectors, 18 and 16 respectively, prior to introduction for engagement. Plunger 76 is in its advanced limit position in its said first rotational positioning relative to housing 30. The male and female connectors 18 and 16 respectively are prepositioned, if possible, either visually or with prior mechanical constraints, such that neck 20 and head 22 are substantially coaxially aligned with bores 50 and 78. The two connectors are then advanced relatively toward one another such that head 22 enters and passes through bore 50 of passage 46 and into chamber 48 until bevel surface 28 opposedly contacts bevel surface 80 of plunger 76. If, due to constraints applied by the particular use or application, it is desirable to initially position the male connector 18 along the axis 53 of female housing 30, as in FIG. 1, the male connector will not be in direct alignment with bore 50. However, as discussed later, some relative lateral motion between the connectors will be possible and, as they are advanced toward each other, the end of crown 24 contacts beveled surface 54 which directs it laterally toward bore 52 and ultimately into bore 50 of passage 46.

As plunger 76 must be subsequently rotated, it must be withdrawn sufficiently to allow pin 88 to clear guide slots 44, as shown generally in FIG. 8. Plunger 76 may have been previously so withdrawn by a force applied externally to the actuating means or, if the longitudinal forces urging the male and female connectors together are sufficient, the male member may act to longitudinally displace the plunger. The former technique is generally the more reliable, however some entry of crown 24 into bore 78 is preferably before the pin 88 is freed from guide slots 44 in order to prevent inadvertent rotation of the plunger 76 prior to said entry. The actual freeing of pins 88 from the guide slots should occur under circumstances in which there is some force, as gravity, acting between the male and female connectors to urge them into contact.

When bevel 28 is seated against bevel 80 and the actuating means withdrawn sufficiently to free pins 88 from their key slots, rod 86 may be rotated 180° such that the pins are realigned with guide slots 44. If the withdrawing force is then removed from the actuating means, and assuming spring 40 has been provided with sufficient strength to overcome the steady state forces acting to force the two connectors together, such as gravity, then the actuating means and plunger 76 will be advanced and the pins will re-enter slots 44, reversed 180°.

When plunger 76 is rotated from the first to second rotational position, it carries the crown 24, head 22 and neck 20 with it, relative to female housing 30. When plunger 76 is advanced in the second rotational position, it urges head 22 outward or forward in housing 30 and into supported contact with seat 66, as seen in FIG. 9. Spring 40 acts through plunger 76 to continuously urge head 22 longitudinally against seat 66. The mated beveled surfaces 26–66 and 28–80 act longitudinally and laterally to align the two connectors and maintain a close tight fit. As plunger 76 carries head 22 laterally into alignment with seat 66, neck 22 is also carried laterally, into side lobe bore 52. When head 22 is fully seated, neck 20 is coaxially aligned with female housing 30.

Dowel pin 88 has been mentioned as one means for locking plunger 76 against rotation about its axis. Seat 66 also serves a similar locking function. As described, seat 66 is a conical bevel in retaining surface 64. This bevel has its axis in line with that of bore 78 when plunger 76 is rotated to its second position, as does side lobe bore 52. When the head 22 of the male connector is seated in seat 66, as seen in FIG. 9, the generally longitudinally extending side walls of seat 66 laterally restrain the head, or more particularly bevel surface 26, about an arc portion thereof designated as $\alpha$ in FIG. 10.

In the preferred embodiment $\alpha$ is somewhat greater than 180°, however an arc, or arcs, of less than 180° between the extremes might be satisfactory in instances in which alignment of the coupled connectors is not critical or the coupled connection is not subjected to significant axial loading.

Figure 10:
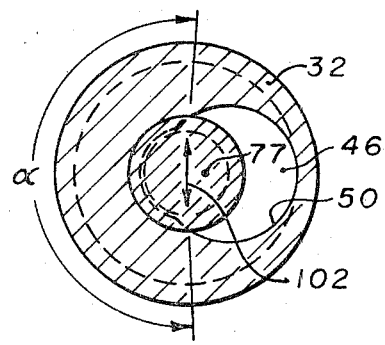
FIG. 10 is a cross-sectional view taken along line 10—10 of FIG. 9 to show the lateral engagement of the male connector by the seat in the female connector.

The axis rotation 77 of plunger 76 is shown, as a point, projected on FIG. 10, and arrows 102 indicate the only initially possible directional components of orbital motion of plunger bore 78 about 77 away from the second or seated position. The bevel 28 of the male connector is engaged by bevel 80 of plunger 76 when seated and must move in the same direction as arrows 102. It is thus evident that side walls of seat 66 which are positioned to restrict or prevent motion of head 22 in the directions indicated by arrows 102 serve to "lock" the head in this seated and coupled position within female connector 16 because motion of head 22 and crown 24 and accordingly bore 78 in the direction of arrows 102 is prevented. Because seat 66 is beveled, continued application of longitudinal force by spring 40 is required to maintain this "locked" relation.

As mentioned above, the angular extent of arc $\alpha$ is preferably greater than 180°. This is accomplished by controlling the depth of seat 66 in retaining surface 64 in combination with limiting the diameter of bore 50. By laterally supporting head bevel 26 around more than 180° of its circumference, beveled seat 66 serves to align or center the male connector along the axis 53 of the female connector and to prevent substantially any lateral movement of head 22 when it is urged into fully seated relationship in seat 66.

In order to uncouple the male and female connectors from one another, the coupling operation is reversed with the actuating means and plunger 76 being withdrawn relative to housing 30 and rotated 180° to the first rotational position and allowed to return to its advanced limit position against retaining surface 64. This operation allows head 22 to be unseated when the plunger is withdrawn if an external force exists between the connectors to move the head longitudinally inwardly relative to seat 66. If no such external force is applied, the head 22 will be positively dislodged from the seat 66 by the action of plunger bore 78 on the upper end of crown 24.

The length of crown 24 within bore 78 in the seated position is such that the bore continues to embrace part of the crown when the plunger is withdrawn, even to its withdrawn limit position. The plunger 76 is rotated in the withdrawn or partially withdrawn position and places a lateral force on crown 24 near its end which is transferred to head 22. If head 22 were being urged longitudinally against seat 66, as in the seated and locked condition, it would be unable to move laterally against the side walls of the seat; however, the head is now free to move longitudinally rearwardly of the seat and it does so because of the inclined surface of the seat. The lateral force applied to head 22 is translated into lateral and longitudinal motion rearwardly up the wall of seat 66 until it is above the lateral restraining surfaces of seat 66 in retaining surface 64, whereupon continued rotation of plunger 76 and the head of the male connector to the first rotational position is essentially unopposed. The male connector 18 and the female connector 16 may then be longitudinally separated from one another.

Depending on the extent to which plunger 76 is withdrawn, the walls of bore 78 will engage crown 24 somewhere along its length. The closer the engagement of the bore 78 is to the beveled end point of the male connector 18 and remote from head 22, the less the crown is closely engaged by the bore, with the result that head 22 and crown 24 are displaced from the seat 66 to the first rotational positioning of the plunger along a laterally extending path somewhat more linear than the orbital path referred to earlier.

Figure 3:
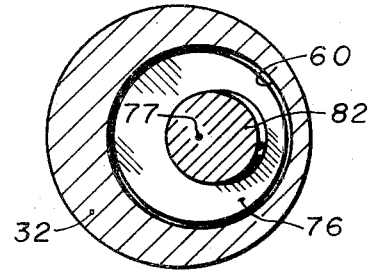
FIG. 3 is a cross-sectional view taken along line 3—3 of FIG. 1.
Figure 4:
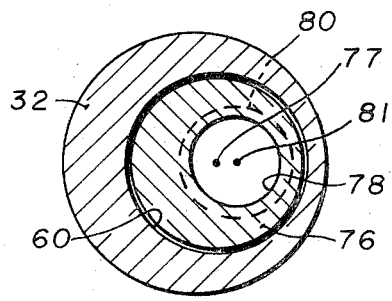
FIG. 4 is a cross-sectional view taken along line 4—4 of FIG. 1.
Figure 5:
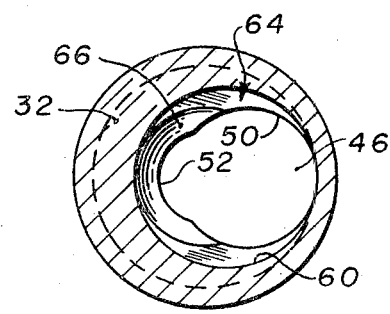
FIG. 5 is a cross-sectional view taken along line 5—5 of FIG. 1 with the operating means removed from the view.

In those applications in which female connector 16 and male connector 18 are freely movable laterally of one another, actuating rod 82 might be coaxial with the axis of rotation 77 of plunger 76. However, where the male connector 18 is supported against lateral motion, as by a support 104, and the female connector 16 is similarly supported at or near its rear end against lateral motion, as in a nuclear control assembly drive, one or both of the connectors will be required to torsionally deflect a small amount to accommodate the relative lateral displacement therebetween which must occur during the coupling and uncoupling operations. This lateral displacement is a maximum in the region of member 32 and plunger 76. If male connector 18 is relatively short and non-deflectable, the deflection must be accommodated by the female connector which is made long enough to deflect at its forward end without significantly stressing. Further, because of the length of the female connector and associated actuating means and becuase it is desirable that the housing 30 be coaxial with neck 20 in the coupled position, it is preferable that spring loaded actuating rod 82 be at least parallel thereto and preferably coaxial therewith in the coupled position. However, in the embodiment depicted, the axis of rotation 77 of plunger 76 is laterally offset somewhat from the centerline of member 32 of housing 30. As the centerline of the actuating means is concentric with housing 30 at end plate 38, actuating rod 82 can be concentric or coaxial with member 32 of the housing in the coupled configuration only if the rod connects plunger 76 off-center of its axis of rotation 77, as is evident in various figures, including FIG. 3. In this embodiment, rod 82 is thus coaxial with the bore 78 in plunger 76.

It will be understood that the embodiment shown and described herein is merely illustrative and that changes may be made without departing from the scope of the invention as claimed.

What is claimed is:

1. Coupling means including male and female connectors, movable longitudinally and laterally relative to one another:
   a. said male connector including a male member having a neck portion and a laterally enlarged head portion longitudinally outwardly thereon for insertion into said female connector; and
   b. said female connector comprising a housing having a longitudinally extending passage therein for entry and egress of said male member and a chamber at the inner end of said passage only partially in registry therewith for receiving said male member head portion, a laterally extending shoulder connecting said passage and chamber and comprising a retaining surface for said head portion and including:
   i. operating means in said chamber supported for rotation relative thereto about a longitudinally extending axis and having means therewith eccentrically disposed relative to said axis of rotation for laterally engaging said male member in said chamber, and
   ii. actuating means for rotating said operating means relative to said chamber between first and second positions, said eccentricity and said first and second rotational positions being such that said engaging means is in male member receiving or discharging alignment with said passage in said first position and is displaced toward said retaining surface sufficiently to locate part of said head portion in longitudinal alignment with said retaining surface in said second position, said operating means acting longitudinally in cooperation with said retaining surface to prevent withdrawal of said male member from said female connector in said second position.

2. The apparatus of claim 1 including means for locking said operating means in said second position to maintain the coupled relationship of said male and female connectors.

3. The apparatus of claim 2 wherein said retaining surface includes a seat therein having longitudinally extending side walls and positioned and shaped to receive and laterally restrain part of said head portion against orbital motion about the axis of said operating means, said operating means is adapted to longitudinally contact said male member and is longitudinally movable relative to said chamber between a withdrawn position allowing insertion of said head portion into said chamber beyond said retaining surface and an advanced position which forces said head portion longitudinally into contact with said seat in said second position and including means for biasing said operating means to said advanced position for maintaining said male and female connectors in locked relationship.

4. The apparatus of claim 1 wherein said male member neck and head portions are circular in cross section and said head includes a first obliquely disposed beveled surface joining it with said neck; said seat in said retaining surface comprises a second obliquely disposed beveled surface open longitudinally along one side thereof to communicate directly with said passage and adapted for oppositely facing close supporting engagement with and about an arc portion of said first beveled surface, said arc portion being sufficient to laterally restrain said head, when fully seated in said second beveled surface, against orbital motion about the axis of said operating means; said operating means are longitudinally movable relative to said chamber into and out of longitudinal contact with said male member in said second rotational position and including means biasing said operating means outwardly into contact with said male member for maintaining said male member fully seated.

5. The apparatus of claim 4 wherein said arc portion of said first beveled surface exceeds 180°, whereby to substantially prevent lateral motion of said head when fully seated in said second beveled surface.

6. The apparatus of claim 4 wherein said passage in said female connector comprises a main cylinder of only slightly greater diameter than said male member head portion and a cylindrical side lobe coextensive with and parallel to the axis of said passage main cylinder and in partial coincidence with said passage main cylinder and said seat, the diameter of said cylindrical side lobe being only slightly greater than said male member neck portion and said coincidence such that said neck is movable laterally thereinto to parallel the axis of said passage main cylinder when said male member is in said seat.

7. The apparatus of claim 4 wherein said chamber is cylindrical and said operating means comprise a cylindrical member in close sliding and rotating relationship with said chamber cylinder, said means for laterally engaging said male member comprising a cylindrical opening parallel said cylindrical chamber in the outer end of said cylindrical member, said cylindrical opening sized to radially closely embrace said male member.

8. The apparatus of claim 7 wherein said cylinder for engaging said male member includes a third beveled surface facing axially outward about an end thereof; and said male member includes a circular crown portion extending axially outward from said head portion and being of shorter length and slightly smaller diameter than said member engaging cylinder and including a fourth beveled surface thereon adapted for close facing contact with said third beveled surface, whereby radial and axial engagement of said male member by said engaging cylinder is afforded.

9. Coupling means comprising:
    a. a cylindrical male member including, in series, a neck portion and a head portion having a crown portion thereon, said head portion being of larger diameter than said neck and crown portions and connected thereto respectively by first and second beveled surfaces; and
    b. a female-type connector including a housing having therein a cylindrical passage and a cylindrical chamber parallel therewith, said passage extending into said connector a predetermined distance and adapted to pass said head portion in close sliding relation therewith and said chamber extending axially inward from the inner end of said passage and being of greater diameter than said passage, a portion of which is in registry with said passage and sized to receive said male member head portion and the remainder being non-aligned with said passage and connected therewith by a third beveled surface adapted for close mating engagement with said first beveled surface, a cylindrical operating member disposed in said chamber in close relative sliding and rotating relationship therewith and having means for moving said operating member axially between inner and outer axial positions and rotationally about the axis thereof between first and second rotational positions, a circular opening in the axially outer end of said operating member having its center offset from the axis of rotation and adapted to receive said crown portion and including a fourth beveled surface adapted to contact said second chamfered surface in close axial and radial supporting engagement, said opening being substantially concentric with said passage in said first rotational position and being offset therefrom toward said third beveled surface in said second rotational position, said inner axial position of said operating member permitting insertion of said male member head portion in said female connector beyond said third beveled surface to allow orbital motion of said head portion relative to the axis of said operating member and said outer axial position of said operating member in said second rotational position places said second and fourth and said first and third beveled surfaces in opposed contacting relationship to lock said male member against axial movement relative to said female connector.

10. The coupling means of claim 9 wherein said third beveled surface is sized and positioned to laterally restrain said male member head portion against orbital motion about the axis of said operating member when said operating member is in both said second rotational position and said outer axial position and including means for biasing said operating member to said outer axial position for maintaining said male member and female connector in locked relationship.

11. The apparatus of claim 10 wherein both said male and female connectors include complementary beveled surfaces at their respective longitudinally outermost ends to facilitate correct relative lateral alignment therebetween for introduction of said male member to said passage.

12. Coupling means including first and second connectors adapted to be connectably intercoupled, said first connector including a longitudinally extending neck portion and a head portion thereon, said head portion extending laterally beyond said neck portion; and said second connector including a first element comprising a support structure having a laterally extending shoulder portion and a longitudinally extending passage through said shoulder portion for passing said first connector head portion therethrough, said shoulder portion including a surface proximate said passage forming a retaining surface for said head and a second element positioned and rotatably supported longitudinally inward of said passage and adapted to be rotated relative to said first element between first and second relative positions about a longitudinal axis and includes means therewith for laterally engaging said first connector near said head portion, said engaging means located laterally relative to said axis of rotation such that it is in registry with said passage in said first rotational position for receiving or discharging said first connector therefrom and in said second position is displaced laterally toward said retaining surface sufficiently to locate part of said head portion in longitudinal alignment with said retaining surface for preventing withdrawal of said first connector from said second connector.

13. The apparatus of claim 12 wherein said second connector first element is an elongated structure, said passage therein is cylindrical, said structure includes a cylindrical opening axially parallel and inward of and communicating with said passage in partial registry therewith, that part in registry sized radially to accept said first member head portion, the connecting surface intermediate the non-registering portions of said passage and opening includes said seating surface and said second element is a cylindrical member located in said opening in close rotating relationship therewith.

* * * * *